Patented Aug. 26, 1941

2,253,528

UNITED STATES PATENT OFFICE 2,253,528

MANUFACTURE OF DERIVATIVES OF UREA

John F. Olin, Grosse Ile, Mich., assignor to Sharples Chemicals Inc., a corporation of Delaware No Drawing. Application June 9, 1939, Serial No. 278,175

17 Claims. (Cl. 260—553)

The present invention pertains to the preparation of alkyl derivatives of urea. A particular object of the invention has been to provide an economical process of producing mono-alkyl derivatives of urea, although certain of the features of the invention are also useful in connection with the manufacture of polyalkyl ureas. The patent to Tenney L. Davis, 1,785,730, teaches a process of producing symmetrical di-alkyl ureas by reacting urea with alkyl-amines at temperatures between 100-170° C. This patent also refers to the fact that mono-alkyl ureas can be formed by reaction of isocyanic acid upon aliphatic amines, but the patentee points out that the mono-alkyl urea formed in connection with that reaction decomposes again upon the application of heat, forming on the one hand, primary amine and isocyanic acid and, on the other, ammonia and alkyl isocyanate. One of the objects of the present invention has been to provide a process in which the undesired decomposition of the alkyl urea referred to in the Davis patent is avoided.

Another object of the invention has been to provide a process in accordance with which a mono-alkyl urea may be formed with a minimization of formation of di-alkyl urea.

Another object of the invention has been to provide a process by which mono- and di-alkyl ureas formed in the practice of the invention may be separated from each other thoroughly and economically.

In the process of the Davis patent, referred to above, the pressure employed in the reaction vessel is relatively low, the reaction apparently being performed at atmospheric pressure. In the case of the manufacture of lower alkyl derivatives of urea, i. e., in cases of the manufacture of alkyl derivatives of urea, of which the corresponding alkyl amines are so volatile as to be removed from the reaction mixture by distillation because of the heat applied in promoting the reaction, Davis avoids such removal of the alkyl amines by reacting the corresponding alkyl ammonium chloride with urea instead of using the free amine. The use of alkyl ammonium chloride in this reaction has the disadvantage, however, that it results in the formation of ammonium chloride, which is not removed from the reaction mixture. The presence of this ammonium chloride in the reaction mixture depresses the reaction and thus results in low conversion of the reactants to produce the desired di-alkyl urea. An object of the present invention has been to provide a technique whereby the lower alkyl ureas may be produced by the direct action of the corresponding amines on urea, thereby avoiding the presence of ammonium chloride in the reaction mixture and substantially improving the conversion of alkyl amine and urea to the desired alkyl urea.

Processes heretofore proposed for the manufacture of mono-alkyl ureas have involved reaction of alkyl isocyanates with ammonia, reaction of ammonium salts with alkali metal cyanates, and reaction of nitrourea with amines, respectively. The raw materials used such syntheses are relatively expensive and difficult to obtain. An object of the present invention has been to produce the desired alkyl ureas from a much cheaper and more plentiful source of raw materials, to wit, from the alkyl amines and urea.

Further objects and advantages of the invention, and the manner in which they have been attained, will be evident from a reading of the following detailed description of the invention. The principles of the invention are applicable to the manufacture of various alkyl and alkylol derivatives of urea, including such derivatives having between one and eighteen carbon atoms in the alkyl radical. They are applicable, in certain of their aspects, to the manufacture of symmetrical di-alkyl and -alkylol ureas, unsymmetrical di-alkyl and -alkylol ureas, and tri-alkyl and -alkylol ureas. They are also applicable to the manufacture of various mixtures of any or all of the above derivatives. For the sake of simplicity of description, the invention will be described first with reference to the manufacture of mono-butyl urea, with the understanding that the invention is not to be limited to the preparation of any particular derivative or mixture of derivatives except as specifically defined in the subjoined claims.

In the preparation of mono-butyl urea in accordance with the present invention, butylamine is mixed with at least a slight molecular excess of urea in an autoclave equipped with an efficient pressure column. The column is connected to a deflegmating condenser provided with a water-cooled jacket. This column is preferably packed with glass Raschig rings or equivalent packing. The top of the deflegmating condenser is connected to an outlet conduit provided with a suitable valve for preventing escape of ammonia until the autogenous pressure in the autoclave reaches a predetermined point, and for permitting escape of ammonia after the pressure reaches the desired point, while maintaining that pressure in the autoclave.

The contents of the reactor are next heated to a temperature above 100° C., and preferably somewhat above 115° C., until a pressure in excess of 125-175 pounds per square inch is developed in the autoclave. When this temperature and pressure are attained ammonia is allowed to escape through the valve in the conduit connected to the top of the deflegmating column. If desired, the valve may be a pressure release valve designed to permit the escape of ammonia automatically upon the attainment of the desired pressure.

Ammonia is continuously refluxed to the column during the course of the reaction, thereby preventing the escape of the alkyl amine from the autoclave.

By conducting the reaction as described above, an excellent yield of the desired butyl urea is obtained, since the refluxing of ammonia keeps all of the butylamine in the reactor until the reaction is completed, and the continuous removal of ammonia from the system avoids the presence of a large quantity of ammonia in the reactor during the course of the reaction, and thus permits the reaction to proceed to the right in accordance with the following equation:

$$RNH_2 + NH_2-CO-NH_2 \rightarrow RNH-CO-NH_2 + NH_3$$

Regardless of the use of moderate molecular excesses of urea in the practice of the process, as suggested above, the reaction mixture will contain at least a small proportion of di-alkyl urea and it will also contain some unchanged urea. The invention includes features of operation by which these constituents can be separated from each other with the result that relatively pure mono-butyl urea is obtained on the one hand and relatively pure di-butyl urea is obtained on the other. In the purification of the reaction mixture, it may first be washed at a low temperature (e. g. 15° C.) with a hydrocarbon solvent, such as benzene, toluene, cyclohexane, or solvent naphtha. The di-alkyl urea is dissolved in the hydrocarbon solvent, but the mono-alkyl urea remains as a residue, since it is only sparingly souble in these solvents at low temperatures. The unchanged urea is insoluble in the hydrocarbon solvents and will remain with the mono-alkyl urea. The mono-alkyl urea may now be separated from the unchanged urea by extraction with a large volume of hot hydrocarbon solvent (e. g., 75° C.), such as benzene, toluene or cyclohexane, or this removal of unchanged urea can be accomplished, after removal of the hydrocarbon solvent, by extraction with cold water (e. g., 0° C.), which dissolves the unchanged urea but not the mono-alkyl urea.

If a very pure mono-alkyl urea is desired, the mono-alkyl fraction produced by the above succession of washing operations, after removal of the wash water containing unchanged urea, may be again extracted with a hydrocarbon solvent to effect still more thorough removal of di-alkyl urea therefrom. Alternatively, the reaction mixture may be first washed with cold water to remove unchanged urea, and the undissolved mixture of mono-alkyl urea and di-alkyl urea thereafter separated into its constituents by extraction of the di-alkyl urea with a hydrocarbon solvent.

In the preferred practice of the invention, the separation of the reaction mixture into mono-butyl urea, di-butyl urea, and unchanged urea, respectively, is accomplished entirely by a series of extraction steps with water. The entire reaction mixture is first dissolved in hot water (e. g., six times its weight of water at 95° C.). The solution is then allowed to stand in a cold place (e. g., approximately 10° C.) overnight, with the result that di-butyl urea is precipitated from solution, while the mono-butyl urea and unchanged urea are retained in solution. This mixture may next be filtered to separate the precipitated di-butyl urea from solution, and the filtrate may then be filtered again with a suitable filter aid (e. g., nuchar) to remove further impurities from the solution. The remaining solution may then be evaporated to dryness on a steam bath under vacuum, and the product is then triturated with water at 0° C., containing a little ice. The triturated mass may then be filtered, the unchanged urea passing through the filter in solution and the mono-butyl urea remaining on the filter. The butyl urea is next dissolved in about its own weight of water and allowed to stand in a cold place (e. g., 0° C.) overnight, to recrystallize the mono-butyl urea, and remove further unchanged urea therefrom. The mixture is next filtered again, and the filtrate is pressed and drained to remove moisture. The filtrate may then be further dried by exposure to air or over calcium chloride. Perfectly white crystals of mono-butyl urea are obtained in this way, which melt between 93 and 95° C.

Di-butyl urea separated from mono-butyl urea by any of the above sequences of purification steps may be refluxed with urea to improve the yield by producing a further quantity of mono-butyl urea in accordance with the following equation:

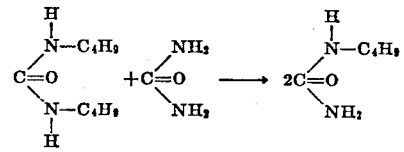

This reaction may be accomplished by heating the di-butyl urea and butyl urea in an autoclave to a temperature in the neighborhood of 160° C. Conversely, if di-butyl urea is the principal product desired, mono-butyl urea obtained as a by-product in purifying the crude di-butyl urea may be converted into di-butyl urea by similar treatment involving refluxing it with a further quantity of butyl amine to effect the following reaction:

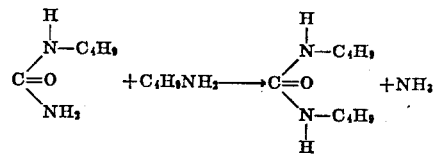

The step of converting di-butyl urea to mono-butyl urea may be accomplished by returning di-butyl urea to the autoclave containing the mono-butyl amine and urea which are to be refluxed to accomplish the principal reaction by which mono-butyl urea is produced as the principal reaction product, and the reaction of di-butyl urea with urea to improve the yield of mono-butyl urea can thus be accomplished concurrently with the reaction of a fresh batch of butyl amine with urea to produce mono-butyl urea. Conversely, the by-product mono-butyl urea may be returned to the autoclave to be mixed with a fresh charge of butyl amine for simultaneous production of di-alkyl urea by alkylation of the fresh charge of urea and returned mono-butyl urea if di-butyl urea is the principal product desired. In either case, the return of the undesired derivative to the autoclave, with proper stoichiometric adjustment of the ratio of butyl amine and urea in the fresh charge, has the advantage that the yield of the desired derivative in the fresh reaction mixture is still further improved by the presence of the undesired derivative, in accordance with the law of mass action. Such a procedure has the still further advantage that it reduces the amount of purifying treatment to be performed on the undesired derivative separated from the desired derivative.

The above description has been directed principally to the production of mono-butyl urea. If di-butyl urea is desired as the principal product, the initial reaction mixture should contain approximately two molecular proportions of butyl amine for each such proportion of urea. By varying the relative proportions of butyl amine and urea a mixture containing practically any desired ratio of butyl urea to di-butyl urea may be obtained. In any case, the reaction technique will be substantially the same as that described above with respect to preparation of mono-butyl urea, except that the reaction mass should be heated to a somewhat higher temperature, (e. g., 150–170° C.) in the production of di-butyl urea.

The process of the invention is applicable to the manufacture of a wide variety of alkyl ureas and alkylol ureas. It is also applicable to the similar manufacture of thio-ureas, although the yields of alkyl thio-ureas obtained in the practice of the invention are relatively small, and when reference is made in the subjoined claims to urea or one of its derivatives, it is to be understood that thio-urea and derivatives of thio-urea are intended to be included by such expressions.

The process of the invention may be employed in producing various alkyl derivatives of urea containing from 1 to 20 carbon atoms in the alkyl radical, including the cyclo-alkyl ureas, such as cyclohexyl ureas. Thus, it may be employed in the manufacture of octyl urea, dodecyl urea, cetyl urea or various other alkyl derivatives of urea or mixtures thereof. It may also be employed in the manufacture of the corresponding alkylol derivatives. Thus, ethanol urea may be produced by reaction of ethanol amine with urea under the same conditions described above for reaction of butyl amine with urea, and symmetrical di-ethanol urea may be produced similarly to the production of di-butyl urea as described above.

Unsymmetrical di-alkyl ureas may be similarly produced by reaction of di-alkyl amines with urea, tri-alkyl ureas may be produced by reaction of mixtures of mono-alkyl amines and di-alkyl amines with urea, or of di-alkyl amines upon mono-alkyl ureas. Tetra-alkyl ureas are not produced in the practice of the invention.

In the case of the manufacture of urea derivatives of relatively high carbon content, e. g., octyl urea derivatives, the technique of separating the di-alkyl urea from the mono-alkyl urea will be somewhat modified, since the mono-alkyl ureas of high carbon content are more soluble in hydrocarbon solvents than the lower alkyl ureas. In view of this fact, it will be desirable to employ a larger molecular excess of the urea in the manufacture of these higher derivatives in case the mono-alkyl urea is desired, since the employment of such molecular excess results in the production of very small proportions of di-alkyl urea. Conversely, if it is desired to produce di-alkyl ureas from these higher alkyl amines, a ratio of alkyl amine to urea which is slightly greater than 2:1 may be employed.

In the separation of the higher mono-alkyl derivatives of urea, such as the mono-octyl derivative, from the di-alkyl derivatives, and unchanged urea the fundamental steps of successive extraction with water and hydrocarbon solvents are followed. In manufacturing octyl ureas, for example, the crude reaction mixture may be first suspended in twice its volume of hot water. The solution is then cooled to 10° C. to precipitate the octyl ureas, which are filtered from the solution, unchanged urea passing through the filter in aqueous solution. The material remaining on the filter is then removed, and dissolved in a hot hydrocarbon solvent, such as a benzene and heptane mixture. The solution is then cooled to 0° C. to precipitate mono-octyl urea from solution, and filtered to remove this precipitate.

EXAMPLE 1.—*Mono-butyl urea*

40 mols of mono-butyl amine (2920 g.) and 40 mols of urea (2400 g.) were placed in a stainless steel autoclave to which was connected a packed column made of stainless steel with a water-cooled deflegmator and a valve in the outlet tube. The product was heated to a point between 125–130° C. until the pressure exceeded that required to liquefy ammonia at the temperature of the outlet stream (125 pounds per square inch). The ammonia was then allowed to escape through the outlet valve into a cold cylinder. The reaction proceeded regularly at a temperature between 125–130° C. and was substantially complete in two hours. The reaction mixture was then removed from the autoclave, and washed with water to effect removal of butyl urea and urea from di-butyl urea. The water was then cooled to a temperature of 0° C. to precipitate the mono-butyl urea. The di-butyl urea remaining after extraction of the reaction mixture with water was then dissolved in hot benzene, which was cooled to a temperature of 10° C., whereupon the small amount of mono-butyl urea contained in this material precipitated from solution.

EXAMPLE 2.—*Symmetrical di-butyl urea*

40 mols of mono-butyl amine (2920 g.) and 20 mols of urea (1200 g.) were mixed together in an autoclave equipped similarly to that employed in Example 1, and the material was treated as in Example 1, except that the temperature was raised to 150° C. in order to facilitate the production of di-butyl urea. The reaction mixture was first washed with hot benzene (78° C.) to dissolve both di-butyl urea and mono-butyl urea. The benzene solution was thereafter cooled to a temperature of 10° C. to effect precipitation of mono-butyl urea. After removal of the mono-butyl urea from the benzene solution of di-butyl urea, the benzene was removed from the di-butyl urea by passing steam through it, leaving a residue consisting essentially of symmetrical di-butyl urea.

EXAMPLE 3.—*Hydroxyethyl urea*

16.3 mols of ethanol amine and 16.3 mols of urea were mixed in a two necked flask and agitated during the course of a run by means of a mercury-sealed stirrer. Heat was applied and the ammonia, which was evolved at a temperature of 130° C. was collected by means of a water scrubber. After approximately two hours the theoretical quantity of ammonia had been evolved. Upon cooling, there was left in the flask a crude solution of hydroxyethyl urea. The product was a viscous, straw-colored liquid with a specific gravity at 28° C. of 1.270. A titration showed that it contains only 0.22% free ethanolamine. The product consists essentially of mono N-hydroxyethyl urea and is of sufficient purity for use as a modifier for urea-formaldehyde resins without further purification.

EXAMPLE 4.—*Unsymmetrical di-butyl urea*

10 mols of urea (600 g.) and 10 mols of dibutylamine (1335 g. of 96.8%) were placed in a three necked flask equipped with a stirrer and reflux condenser. The product was heated on oil bath to 130–140° C. where it was maintained until no further quantities of ammonia were evolved. This required about 4 hours. There was left in the reaction flask a viscous, straw-colored liquid, possessing a specific gravity at 37° C. of 0.934. A titration of the product showed it to contain 0.6% free dibutyl amine. Because of the inability of an unsymmetrical di-alkyl urea to react with a second mol of di-alkyl amine to produce a tetra-alkyl urea, the product obtained was substantially pure unsymmetrical di-butyl urea.

EXAMPLE 5.—*Octyl urea*

1015 g. of 2-ethylhexyl amine (7.86 mols) and 943 g. of urea (15.7 mols) were placed in the stainless steel autoclave described in Example 1. With agitation the product was heated to 140° C.; the ammonia being vented at a pressure of 200 lbs. gauge. After removal from the autoclave the excess urea was removed from the crude octyl urea by washing with two 700 cc. portions of cold water. It was now dissolved in one liter of hot benzene and refluxed, employing a dehydrating tube, until dry. The anhydrous solution in benzene was filtered and one liter of hexane added. The solution was thoroughly mixed, and placed in a cool place overnight (temp. of approx. 10° C.). Mono-octyl urea, melting between 60–65° C. was obtained in the form of shining colorless plates.

Modifications will be obvious to those skilled in the art and I do not therefore wish to be limited except by the scope of the sub-joined claims.

I claim:

1. A process of producing a mono-alkyl derivative of urea which comprises reacting an alkyl amine with urea in approximately equivalent molecular proportions, by heating a mixture thereof to a temperature between 100° C. and the decomposition temperature of the desired alkyl urea.

2. A process of producing a mono-alkyl derivatives of urea which comprises reacting an alkyl amine with urea by heating a mixture of said alkyl amine and urea to a temperature between 100° C. and the decomposition temperature of the desired alkyl urea and thereby producing a crude reaction mixture containing the desired mono-alkyl urea, unchanged urea and by-product di-alkyl urea, thereafter extracting the reaction mixture with water at a temperature at which the formed di-alkyl urea and mono-alkyl urea are insoluble in the water but at which the unchanged urea is soluble in the water, and thereafter extracting the precipitated mixture of di- and mono-alkyl ureas with a hydrocarbon solvent at a temperature at which the formed di-alkyl urea is soluble in the hydrocarbon solvent but at which the desired mono-alkyl urea is insoluble in said solvent.

3. A process of producing alkyl derivatives of urea which comprises reacting an alkyl amine with urea by heating a mixture of said alkyl amine and urea to a temperature between 100° C. and the decomposition temperature of the desired alkyl urea and thereby producing a crude reaction mixture containing an alkyl urea reaction product and unchanged urea and thereafter separating the alkyl urea reaction product from the unchanged urea by extracting unchanged urea from the alkyl urea of said reaction mixture with water at a temperature at which said alkyl urea is insoluble in the water but at which the unchanged urea is soluble in the water.

4. A process of producing alkyl derivatives of urea which comprises reacting an alkyl amine with urea by heating a mixture of said alkyl amine and urea to a temperature between 100° C. and the decomposition temperature of the desired alkyl urea and thereby producing a reaction mixture containing a first urea constituent chosen from the class consisting of unchanged urea, an alkyl urea, and a mixture of unchanged urea and alkyl urea, and a second urea constituent consisting of an alkyl urea of a higher degree of alkylation than said first urea constituent, and thereafter separating said second urea constituent from said first urea constituent by extracting the mixture of said first and second constituents with a hydrocarbon solvent at a temperature at which the second urea constituent is soluble in said hydrocarbon solvent but at which said first urea constituent is insoluble in said hydrocarbon solvent.

5. A process of producing alkyl derivatives of urea which comprises reacting an alkyl amine with urea by heating a mixture of said alkyl amine and urea to a temperature between 100° C. and the decomposition temperature of the desired alkyl urea and thereby producing a reaction mixture containing a first urea constituent chosen from the class consisting of unchanged urea, an alkyl urea, and a mixture of unchanged urea and alkyl urea, and a second urea constituent consisting of an alkyl urea of a higher degree of alkylation than said first urea constituent and thereafter separating said second urea constituent from said first urea constituent by extracting the mixture of said first and second constituents with water at a temperature at which the second urea constituent is insoluble in said water but at which said first urea constituent is soluble in said water.

6. A process of producing an alkyl derivative of urea which comprises reacting an alkyl amine with urea in a ratio of alkyl amine to urea corresponding approximately to the degree of alkylation desired, by heating a mixture thereof to a temperature between 100° C. and the decomposition temperature of the desired alkyl urea, and discharging ammonia from the reaction mixture during the course of the reaction, while retaining the unreacted alkyl amine in the reacting mixture by establishing an ammonia reflux.

7. A process of producing a mono-alkyl derivative of urea which comprises reacting an alkyl amine with urea in approximately equivalent molecular proportions, by heating a mixture thereof to a temperature between 100° C. and the decomposition temperature of the desired alkyl urea, and discharging ammonia from the reaction mixture during the course of the reaction, while retaining the unreacted alkyl amine in the reacting mixture by establishing an ammonia reflux.

8. A process of producing an unsymmetrical di-alkyl urea, which comprises reacting a di-alkyl amine with urea in approximately equivalent molecular proportions, by heating a mixture thereof to a temperature between 100° C. and the decomposition temperature of the desired alkyl urea, and discharging ammonia from the reaction mixture during the course of the reaction, while retaining the unreacted alkyl amine in the reacting mixture by establishing an ammonia reflux.

9. A process of producing a symmetrical di-alkyl urea which comprises reacting a mono-alkyl amine with urea in approximately a ratio of two mols of amine to one mol of urea, by heating a mixture thereof to a temperature between 100° C. and the decomposition temperature of the desired alkyl urea, and discharging ammonia from the reaction mixture during the course of the reaction, while retaining the unreacted alkyl amine in the reacting mixture by establishing an ammonia reflux.

10. A process of producing an alkyl derivative of urea which comprises reacting an alkyl amine with urea in a ratio of alkyl amine to urea corresponding approximately to the degree of alkylation desired, by heating a mixture thereof to a temperature between 100° C. and the decomposition temperature of the desired alkyl urea, and discharging ammonia from the reaction mixture during the course of the reaction, while retaining the unreacted alkyl amine in the reacting mixture by establishing an ammonia reflux and maintaining the reacting mixture under sufficient super-atmospheric pressure to avoid loss of the amine.

11. A process of producing a mono-alkyl derivative of urea which comprises reacting an alkyl amine with urea in approximately equivalent molecular proportions, by heating a mixture thereof to a temperature between 100° C. and the decomposition temperature of the desired alkyl urea, and discharging ammonia from the reaction mixture during the course of the reaction, while retaining the unreacted alkyl amine in the reacting mixture by establishing an ammonia reflux and maintaining the reacting mixture under sufficient super-atmospheric pressure to avoid loss of the amine.

12. A process of producing an unsymmetrical di-alkyl urea, which comprises reacting a di-alkyl amine with urea in approximately equivalent molecular proportions, by heating a mixture thereof to a temperature between 100° C. and the decomposition temperature of the desired alkyl urea, and discharging ammonia from the reaction mixture during the course of the reaction, while retaining the unreacted alkyl amine in the reacting mixture by establishing an ammonia reflux and maintaining the reacting mixture under sufficient super-atmospheric pressure to avoid loss of the amine.

13. A process of producing a symmetrical di-alkyl urea which comprises reacting a mono-alkyl amine with urea in approximately a ratio of two mols of amine to one mol of urea, by heating a mixture thereof to a temperature between 100° C. and the decomposition temperature of the desired alkyl urea, and discharging ammonia from the reaction mixture during the course of the reaction, while retaining the unreacted alkyl amine in the reacting mixture by establishing an ammonia reflux and maintaining the reacting mixture under sufficient super-atmospheric pressure to avoid loss of the amine.

14. In the manufacture of alkyl derivatives of urea, the step of purifying a reaction mixture containing a first reaction constituent chosen from the class consisting of urea, alkyl derivatives of urea and mixture of urea and alkyl derivatives of urea, and a second reaction constituent consisting of an alkyl derivative of urea of a higher degree of alkylation than said first reaction constituent, said step being accomplished by separationg said first reaction constituent from said second reaction constituent by extracting the mixture of said first reaction constituent and said second reaction constituent with water at a temperature at which said first reaction constituent is soluble in said water but at which the said second reaction constituent is insoluble in said water.

15. A process of producing an unsymmetrical di-alkyl urea, which comprises reacting a di-alkyl amine with urea in approximately equivalent molecular proportions, by heating a mixture thereof to a temperature between 100° C. and the decomposition temperature of the desired alkyl urea.

16. A process of producing an alkyl derivative of urea chosen from the class consisting of mono-alkyl ureas and unsymmetrical di-alkyl ureas which comprises reacting an alkyl amine chosen from the class consisting of mono- and di-alkyl amines with urea, by heating a mixture thereof to a temperature between 100° C. and the decomposition temperature of the desired alkyl urea, and discharging ammonia from the reaction mixture during the course of the reaction, while retaining the unreacted alkyl amine in the reacting mixture.

17. In the manufacture of alkyl derivatives of urea, the step of purifying a reaction mixture containing a first reaction constituent chosen from the class consisting of urea, alkyl derivatives of urea, and mixtures of urea and alkyl derivatives of urea, and a second reaction constituent consisting of an alkyl derivative of urea of a higher degree of alkylation than said first reaction constituent, said step being accomplished by separating said first reaction constituent from said second constituent by extracting the mixture of said first reaction constituent and said second reaction constituent with a hydrocarbon solvent at a temperature at which said first reaction constituent is insoluble in said hydrocarbon solvent but at which said second reaction constituent is soluble in said hydrocarbon solvent.

JOHN F. OLIN.